UNITED STATES PATENT OFFICE.

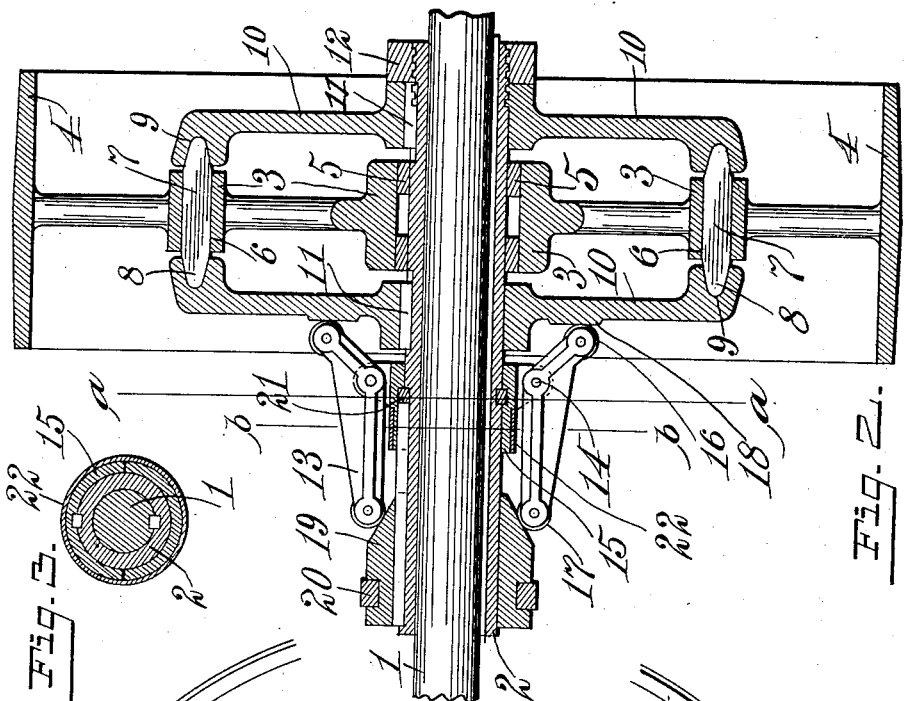

JOHN F. MORGAL, OF DAYTON, OHIO.

CLUTCH.

1,092,379. Specification of Letters Patent. Patented Apr. 7, 1914.

Application filed February 15, 1913. Serial No. 748,682.

*To all whom it may concern:*

Be it known that I, JOHN F. MORGAL, a citizen of the United States, residing at Dayton, in the county of Montgomery and State of Ohio, have invented certain new and useful Improvements in Clutches; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in friction clutches.

The object of the invention is to provide a simple and highly efficient clutch having the features hereinafter described and claimed.

Referring to the accompanying drawings, Figure 1 is a side elevation of the clutch, the same being a section on the line *a—a* of Fig. 2 with parts broken away; Fig. 2 is a section on the line *c—c* of Fig. 1; and Fig. 3 is a section on the line *b—b* of Fig. 2.

In the specification and drawings, similar reference characters indicate corresponding parts.

Referring more particularly to the drawings, 1 represents a shaft or main driven member to which is keyed a sleeve 2, a portion of which is exteriorly threaded. Freely mounted on said sleeve 2 is a driving member 3, which in the present instance, is an integral part of a pulley 4. The said driving member 3 is provided with bearings 5 which are journaled on the sleeve 2, and is further provided with a series of pockets 6 which are adapted to receive removable clutching members 7. The said members 7 are preferably made of hard wood and are provided with wedge-shaped ends 8, which lie in annular V-shaped channels 9 in disks or driven members 10. These disks 10 are splined to the sleeve 2 by means of keys 11, and one of said driven members 10 abuts against an adjusting nut 12 on the sleeve 2, while the other of said members 10 is adapted to be pressed against the friction members 7, and to thus cause said members 7 to bind the first named disk or member 10, by non-adjustable levers 13. The levers 13 are pivoted at 14 to a collar 15 keyed to the sleeve 2. The short ends of the levers 13 are provided with rollers 16 which engage an elevated race or track 18 on the other face of one of the members 10, while the other ends of the said levers 13 are provided with rollers 17 which engage a shiftable cone-shaped actuator 19 splined to the sleeve 2. The actuator 19 may be shifted by any suitable means, (not shown), which may include a ring 20 mounted in said actuator 19. The collar 15 is held against longitudinal movement on the sleeve 2 by a ring 21 which rests in grooves in the collar and sleeve. The ring 21 and collar 15 are made of two portions which arrangement permits said ring and collar to be placed around the sleeve 2. The two portions of the collar are held in position by a ring 22 which passes around said collar. To set the clutch, the cone-shaped actuator 19 is shifted toward the collar 15. This rocks the levers 13 and presses one of the members 10 against the wedges 8 of the clutching members 7. Owing to the driving member 3 being freely movable on the collar 2, the other ends of the clutching members 7 will be pressed against the disk or member 10 which is held by the adjusting nut 12, which engages the screw-threaded portion of the sleeve 11. The clutching action is secured by forcing the wedges 8 in the V-shaped grooves 9, and as both ends of said members 7 are provided with wedge-shapes, a clutching action of equal pressure is secured on both sides of the driving member 3 which equalizes the torque. The wear of the wedges 8 may be compensated for by the adjusting nut 12, which provides all the necessary adjustment. The said adjusting nut is centrally located in relation to all the frictional wearing surfaces, and by means thereof the clutch may be easily and evenly adjusted to distribute the strains. The members 7 are held in the pockets 6 by the members 10, and, as the said members 7 are removable, the parts most subject to wear are easily renewed. The levers 13, it will be noted, have non-changeable fulcrums. This insures a uniformity in the operation, a non-liability to apply excessive force in throwing in the clutch.

While in the drawings and specification, I have shown and described the member 1 as the driven member and the member 3 as the driving member, it is to be understood that this order may be reversed.

Having described my invention, I claim.

In a clutch, the combination with driving and driven members one of which is provided with an annular recess, and actuating means for connecting said driving and driven members, of a split supporting ring upon which said actuating means is mounted, said ring being also provided with an internal annular recess, a split connecting ring mounted in said annular recesses, and a ring mounted on said supporting ring and holding said supporting ring in position in said annular recesses, substantially as described.

In testimony whereof I affix my signature, in presence of two witnesses.

JOHN F. MORGAL.

Witnesses:
R. H. McELROY,
R. J. McCARTY.

Copies of this patent may be obtained for five cents each, by addressing the "Commissioner of Patents, Washington, D. C."